(12) United States Patent
Boyle et al.

(10) Patent No.: US 11,047,570 B2
(45) Date of Patent: Jun. 29, 2021

(54) FURNACE BURNER

(71) Applicant: Berry Metal Company, Harmony, PA (US)

(72) Inventors: Dennis Boyle, Pittsburgh, PA (US); Michael Mattich, Cheswick, PA (US)

(73) Assignee: Berry Metal Company, Harmony, PA (US)

( * ) Notice: Subject to any disclaimer, the term of this patent is extended or adjusted under 35 U.S.C. 154(b) by 0 days.

(21) Appl. No.: 15/803,455

(22) Filed: Nov. 3, 2017

(65) Prior Publication Data

US 2018/0313536 A1    Nov. 1, 2018

Related U.S. Application Data

(60) Provisional application No. 62/416,817, filed on Nov. 3, 2016.

(51) Int. Cl.
*F23D 14/22* (2006.01)
*F23D 14/48* (2006.01)
*F23D 14/32* (2006.01)

(52) U.S. Cl.
CPC .............. *F23D 14/22* (2013.01); *F23D 14/32* (2013.01); *F23D 14/48* (2013.01)

(58) Field of Classification Search
CPC ........... F32D 14/22; F32D 14/32; F32D 14/48
USPC ........................................... 431/187
See application file for complete search history.

(56) References Cited

U.S. PATENT DOCUMENTS

| 2,215,079 | A | | 9/1940 | Hess | |
|---|---|---|---|---|---|
| 4,586,895 | A | * | 5/1986 | Battles | F27D 25/00 432/2 |
| 5,714,113 | A | * | 2/1998 | Gitman | C21C 5/4606 266/182 |
| 7,611,563 | B2 | * | 11/2009 | Memoli | C21C 5/5217 266/221 |
| 2006/0000467 | A1 | * | 1/2006 | Hibshman, II | F23D 14/66 126/39 E |
| 2013/0086949 | A1 | | 4/2013 | Charbonneau | |
| 2016/0075587 | A1 | * | 3/2016 | Baker | F23C 3/004 65/134.4 |
| 2016/0076764 | A1 | | 3/2016 | Hegde et al. | |

* cited by examiner

*Primary Examiner* — Steven B McAllister
*Assistant Examiner* — Benjamin W Johnson
(74) *Attorney, Agent, or Firm* — Clark Hill PLC; Adam J. Fromm

(57) ABSTRACT

A burner, comprising: an oxygen supply tube and a burner tip defining a concave face; wherein the burner tip defines a main oxygen nozzle having a parabolic shape.

12 Claims, 4 Drawing Sheets

FURNACE BURNER

This application claims the benefit of provisional patent application U.S. Ser. No. 62/416,817 filed Nov. 3, 2016, which is incorporated by reference herein for all purposes.

FIELD OF THE DISCLOSURE

The present disclosure generally relates to an improved burner useful in apparatus such as auxiliary burners used in metal melting, decarburization, refining and processing, for example, steel making in an electric arc furnace (EAF) or blast furnace.

BACKGROUND OF THE DISCLOSURE

Generally auxiliary burners are used to assist in the steel making process to add thermal energy by the combustion of fuel, the injection of oxidizing gas for melt refining, foamy slag production or post combustion of carbon monoxide, and the injection of particulates for slag and foamy slag production. In many instances, the oxidizing gas is introduced as a high velocity stream that may exceed sonic velocities.

Existing furnace burners have various deficiencies that detract from the efficiency and economy of the steelmaking process.

In order to overcome the disadvantages associated with typical burners, it would be desirable to provide a burner that optimizes efficiencies by having a burner tip defining a parabolic main oxygen nozzle and V-shaped fuel supply ports; an oxygen supply tube removably attached to a burner tip for ease of cleaning or replacement and a burner tip with a tapered outer diameter for an improved mechanical seal.

BRIEF SUMMARY OF THE DISCLOSURE

Many other variations are possible with the present disclosure, and those and other teachings, variations, and advantages of the present disclosure will become apparent from the description and figures of the disclosure.

One aspect of a preferred embodiment of the present disclosure comprises a burner, comprising an oxygen supply tube and a burner tip defining a concave face; wherein the burner tip defines a main oxygen nozzle having a parabolic shape.

In another aspect of a burner of the present disclosure, the oxygen supply tube is removably attached to the burner tip.

In yet another aspect of a burner of the present disclosure, an outer diameter of the burner tip is tapered.

In another aspect of a burner of the present disclosure, the concave face defines a plurality of V-shaped fuel supply ports.

Another aspect of a preferred embodiment of the present disclosure comprises A burner, comprising an oxygen supply tube removably attached to a burner tip; wherein the burner tip has a tapered outer diameter and defines a concave face; wherein the burner tip defines a main oxygen nozzle having a parabolic shape; and wherein the concave face defines a plurality of V-shaped fuel supply ports.

BRIEF DESCRIPTION OF THE SEVERAL VIEWS OF THE DRAWINGS

For the present disclosure to be easily understood and readily practiced, the present disclosure will now be described for purposes of illustration and not limitation in connection with the following figures, wherein.

DETAILED DESCRIPTION

In the following detailed description, reference is made to the accompanying examples and figures that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "disclosure" merely for convenience and without intending to voluntarily limit the scope of this application to any single disclosure or inventive concept if more than one is in fact disclosed.

The following description is, therefore, not to be taken in a limited sense, and the scope of this disclosure is defined by the appended claims.

Figure 1:
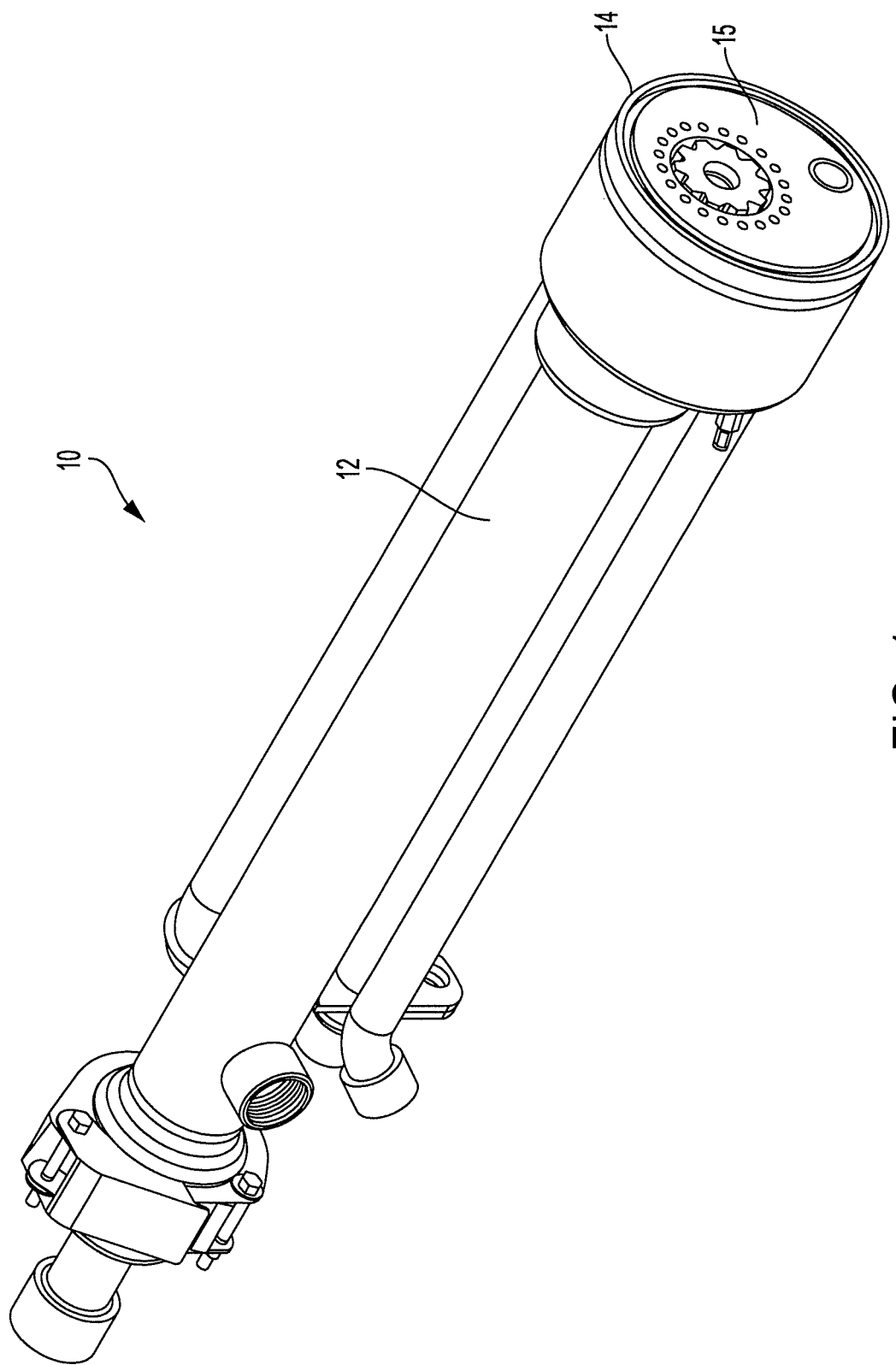
FIG. 1 shows an exterior top, perspective view of a preferred burner according to the present disclosure.
Figure 2:
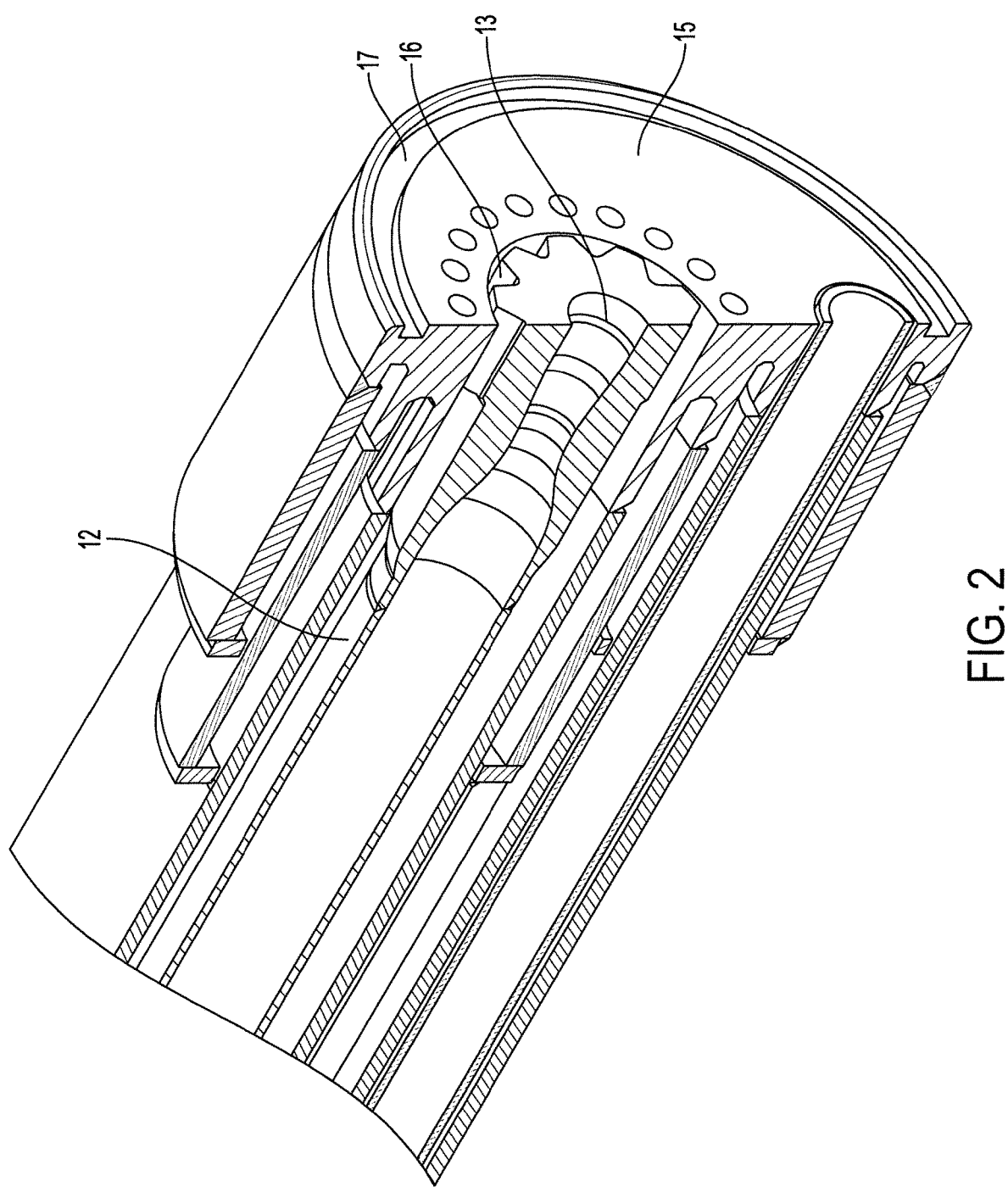
FIG. 2 shows an exterior top, perspective and cross-sectional view of the burner of FIG. 1 including its burner tip section.
Figure 3:
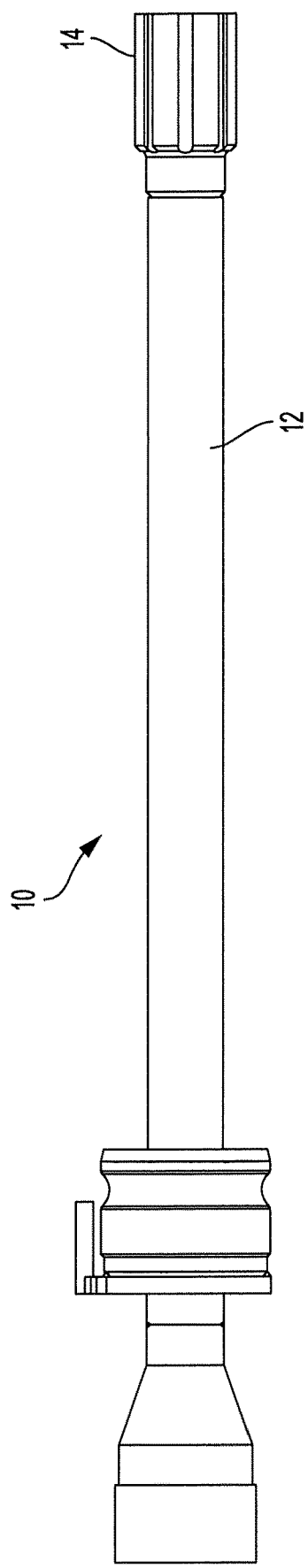
FIG. 3 shows an elevational side view of a preferred burner according to the present disclosure.
Figure 5:
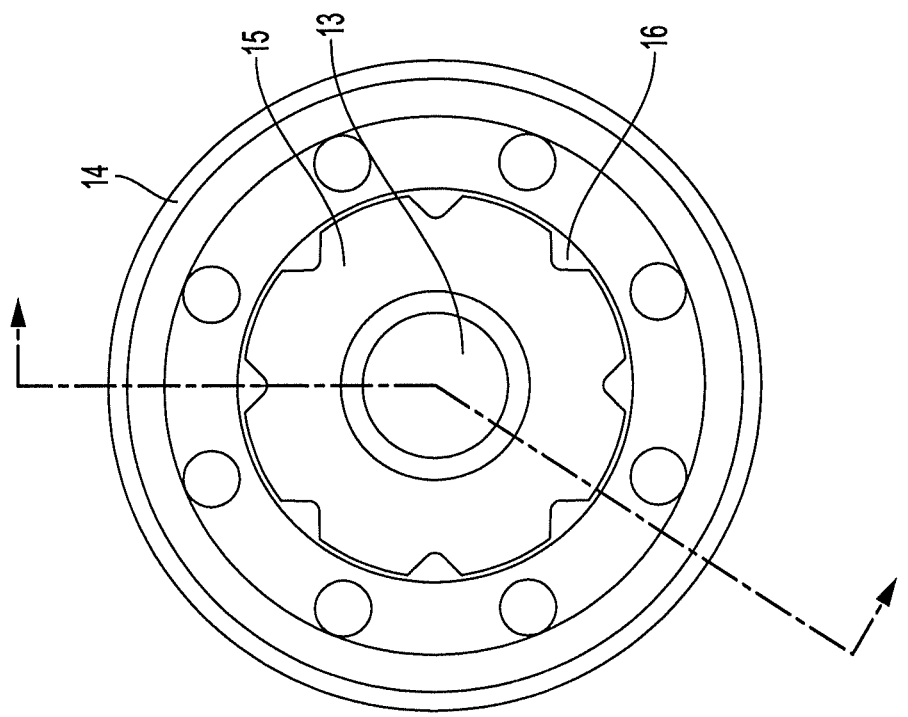
FIG. 5 shows an elevational end view of a burner tip of a preferred burner according to the present disclosure.
Figure 4:
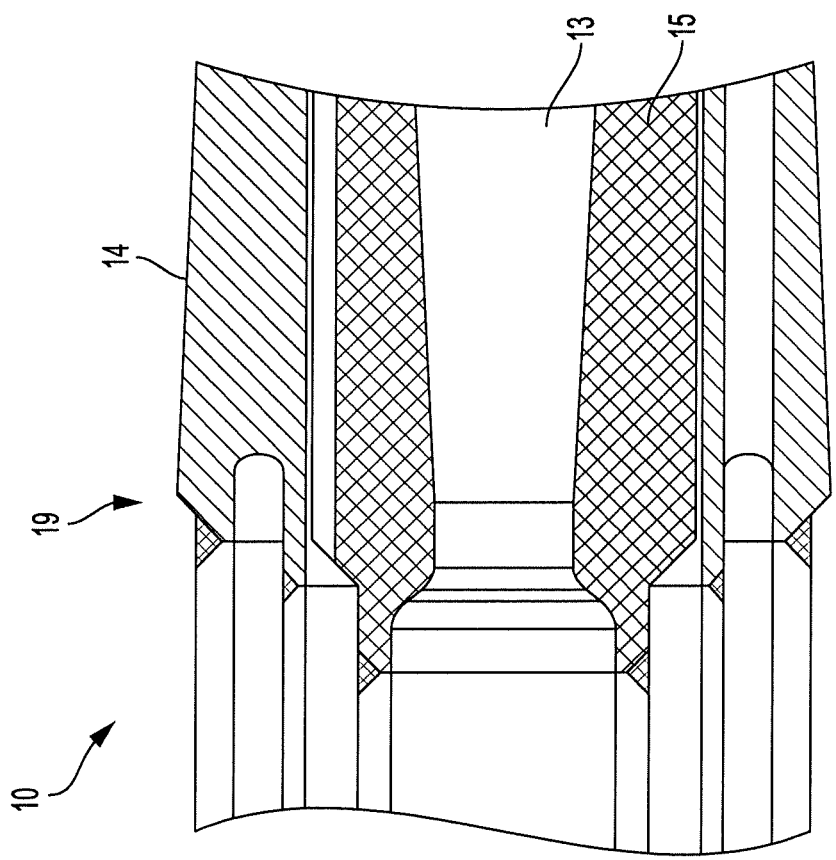
FIG. 4 shows a cross-sectional view of a burner tip of a preferred burner according to the present disclosure.

FIGS. 1-5 show a preferred burner 10, such as a "decarb burner" or other types of burners such as for an EAF (Electric Arc Furnace), blast furnace or other type of metallurgical furnace, of the present disclosure, comprises an oxygen supply tube 12 and a burner tip 14 defining a concave face 15. Burner tip 14 and/or concave face 15 preferably define a groove 17 machined or otherwise, a main oxygen nozzle 13 having a parabolic shape and a plurality of V-shaped natural gas ports 16. The outer diameter 19 of burner tip 14 preferably is tapered to provide an improved mechanical seal. Also, the burner 10 preferably comprises a ceramic pilot ignitor.

Preferably, sizes of the burner tip 14 range from 3 inches to six inches in diameter. The burner 10 may be of various lengths and water-cooled or not water-cooled.

Preferably the oxygen supply tube 12 is removably attached to the burner tip 14 of burner 10 to provide for ease of cleaning and/or replacement of the supply tube 12 or burner tip 14.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

What is claimed is:

1. A burner for use in a metallurgical furnace, the burner comprising:

an oxygen supply tube;

a burner tip having a first end and a second end, the second end defining an outermost face of the burner tip, wherein the burner tip is removably attached to the oxygen supply tube at the first end of the burner tip, the burner tip further comprising:
an outer diameter and a length, wherein the outer diameter of the burner tip is tapered along the length of the burner tip;
a concave face at the second end of the burner tip;
an oxygen nozzle having a parabolic shape and being disposed in the concave face of the burner tip; and
a plurality of fuel supply ports each having a v-shape and being both disposed in the concave face of the burner tip and radially disposed around the oxygen nozzle;
wherein the outer diameter of the burner tip decreases along the length of the burner tip in a direction from the first end of the burner tip to the second end of the burner tip; and
wherein the concave face is substantially perpendicular to the length of the burner tip.

2. The burner of claim 1, wherein the concave face is completely defined within the outer diameter at the second end of the burner tip.

3. The burner of claim 1, wherein the burner is water-cooled.

4. The burner of claim 1, the burner further comprising at least eight fuel supply ports.

5. The burner of claim 1, the burner further comprising a groove disposed in the concave face and radially disposed around the fuel supply ports.

6. The burner of claim 1, wherein the oxygen nozzle is centrally disposed in the concave face.

7. The burner of claim 1, the oxygen supply tube further comprising an outer diameter, wherein the outer diameter of the first end of the burner tip is greater than the outer diameter of the oxygen supply tube.

8. The burner of claim 1, further comprising an ignitor.

9. The burner of claim 1, wherein the fuel supply ports are natural gas fuel supply ports.

10. The burner of claim 1, wherein the burner tip is substantially cylindrical.

11. The burner of claim 1, the oxygen supply tube further comprising a length, and wherein the length of the oxygen supply tube is at least two times as long as the length of the burner tip.

12. The burner of claim 1, wherein the metallurgical furnace is an electric arc furnace or a blast furnace.

* * * * *